(12) United States Patent
Lerat et al.

(10) Patent No.: US 6,406,131 B2
(45) Date of Patent: Jun. 18, 2002

(54) DEVICE FOR MOVING A FLUID (75) Inventors: Yannick J. Lerat; Eric Masera; Olivier J. Poncelet, all of Chalon sur Saone; Thierry G. Vachette, Carnoux, all of (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/892,830

(22) Filed: Jun. 27, 2001

Related U.S. Application Data (63) Continuation-in-part of application No. 09/249,459, filed on Feb. 12, 1999.

(51) Int. Cl.[7] .................................................. B41J 2/04
(52) U.S. Cl. ......................................................... 347/54
(58) Field of Search ............................. 347/45, 54, 55, 347/56; 417/321, 478

(56) References Cited

U.S. PATENT DOCUMENTS

| 4,166,277 A | 8/1979 | Cielo et al. |
| 4,206,467 A | 6/1980 | Fujii |
| 4,275,290 A | 6/1981 | Cielo et al. |
| 4,396,925 A | 8/1983 | Kohashi |
| 5,278,126 A | 1/1994 | Katano et al. |
| 5,515,085 A | 5/1996 | Hotomi et al. |
| 6,231,177 B1 * | 5/2001 | Cherukuri et al. .......... 347/105 |

FOREIGN PATENT DOCUMENTS

| EP | 0 796 902 A2 | 9/1997 |
| JP | 60110709 | 11/1983 |
| JP | 04021844 | 5/1990 |
| JP | 08216368 | 2/1995 |
| JP | 08230232 | 3/1995 |

* cited by examiner

*Primary Examiner*—John Barlow
*Assistant Examiner*—Michael S Brooke
(74) *Attorney, Agent, or Firm*—David A. Novais (57) ABSTRACT

The present invention relates to a device for moving a fluid which can be used in the ink jet printing art. The device of the present invention includes a mechanism for moving the fluid by using polymers. The polymers have hydrophilic or hydrophobic properties that can be selected under the action of an external stress.

22 Claims, 9 Drawing Sheets

DEVICE FOR MOVING A FLUID

CROSS-REFERENCE TO RELATED APPLICATION

This is a continuation-in-part of application Ser. No. 09/249,459 filed Feb. 12, 1999, titled DEVICE FOR MOVING A FLUID by Yannick Lerat, Eric Masera, Olivier Poncelet and Thierry Vachette.

FIELD OF THE INVENTION

The present invention relates to a device for moving a fluid, with the device capable of being used in an ink jet printer.

BACKGROUND OF THE INVENTION

In ink jet printing technology, the main concerns are to improve the quality as well as the speed of printing. An objective of almost all printing technologies developed at present is to produce high quality copies as fast as possible. For ink jet technologies, to achieve fast printing, various manufacturers increase the number of nozzles on the surface of the heads which are capable of ejecting ink drops in order to print a greater number of points in parallel on the receiving medium. However, the number of nozzles on the surface of the head is limited either because of problems related to heat dissipation in methods which use high temperature ink, such as in technologies developed by Canon and Hewlett Packard; or because of problems related to dimensional instability due to vibrations caused by the use of piezoelectric technologies, such as those developed by Seiko-Epson.

U.S. Pat. No. 5,612,725 discloses an ink-jet recording head whose nozzles and ink flow channels can readily be formed and thus mass produced and which uses inexpensive glass and plastic plates. Components of the ink-jet recording head are collected together by a thermal fusion bonding method which improves the quality of the assembly. Moreover, the inner faces of the through-hole and the intermediate nozzle are made hydrophilic, whereas the inner and open faces of the terminal nozzle are made water-repellent or hydrophobic. The state of faces of the components are permanently either hydrophilic or hydrophobic; the state of a given element cannot be changed from hydrophilic to hydrophobic or inversely.

One of the technologies traditionally used in ink jet heads includes raising the ink found in a channel to a high temperature in a short time, typically 300 to 400° C. This causes local vaporization of the ink which causes the expulsion as drops of the liquid part of the ink found between the vaporization zone and the surface of the ink jet head. This method requires thermal energy in the volume of the ink jet head itself, which must then be dissipated.

Other techniques, for example those described in Pat. Application WO96/32284, includes bringing a fluid into contact with a ring shaped heating element located at the periphery of the opening of a channel linking a reservoir containing the fluid to the opening on the surface of the ink jet head. Pressure is applied to the reservoir in order to allow the ink to be sent through the channel and to spread over the heating ring surface of the ink jet head.

When the heating element of the ink jet head is raised to a temperature of about 130° C., there are significant changes to the surface tension of the ink drop in contact with the heating element. The surface tension change causes a decrease in the radius of curvature of the ink drop meniscus thus allowing it to run freely through the channel and to form a drop of the appropriate size for the printing required. Once formed, this drop is then ejected by means that can be an electrostatic field between the ink jet head and the printing medium, for example a sheet of paper. This technique, which has the advantage of considerably lowering the temperature needed to eject a unit volume of ink, is thus more appropriate to the manufacture of highly integrated ink jet heads. However, while in theory it is necessary only to heat the surface of the ink drop meniscus to get the change in its radius of curvature and thus to get the formation of the ink drop, in practice it is necessary to heat the whole volume of the ink drop which requires a much higher energy supply to eject an ink drop. However, it should be noted that as the ink is heated in its volume, part of the energy supplied to get the ink drop is still contained in it on ejection; this makes the dissipation of this energy easier, as it does not stay confined in the ink jet head itself

SUMMARY OF THE INVENTION

An object of the present invention is to provide a device for moving a fluid, for example ink, which minimizes the amount of energy required to eject a drop of this fluid. Such a device allows a fluid to be ejected out of a channel, and allows fluid with an accurately set volume to be ejected.

The present invention relates to a device for moving a fluid. The device includes:
a) a least one polymer element having hydrophilic or hydrophobic properties, with the polymer element being in contact with said fluid; and
b) at least one stimulus element for generating an external stress on the polymer element to select hydrophilic or hydrophobic properties corresponding to two different hydrophilic or hydrophobic states of the polymer element, and thus allowing a switching of the polymer element from one state to the other.

The present invention also relates to a method for moving a fluid which involves the use of a polymer whose hydrophilic or hydrophobic properties can be selected under the action of an external stress in a device for moving this fluid.

The present invention also relates to a printing fluid jet head that includes:
a) at least one internal channel ended by a nozzle, an outflow of a printing fluid in said nozzle being directed to an outside of said fluid jet head;
b) at least one device for feeding a printing fluid through an end of the internal channel opposite to said nozzle; and
c) a device for moving the printing fluid. The device for moving the printing fluid comprises at least one polymer element having hydrophilic or hydrophobic properties. The polymer element is in contact with the printing fluid, and the hydrophilic or hydrophobic properties of the polymer element corresponds to two different hydrophilic or hydrophobic states being selected under an action of an external stress provided by at least one stimulus element.

The present invention also relates to a printing method which comprises the steps of contacting a fluid with a polymer element, with the polymer element comprising polymers whose hydrophilic or hydrophobic properties are selected under an action of an external stress; and moving the fluid by switching the polymer element between a hydrophilic state and a hydrophobic state.

The present invention also relates to a printing fluid jet head which comprises a polymer element having hydrophilic or hydrophobic properties which are selected under an action of an external stress. The polymer element is adapted to contact a fluid to be moved and move the fluid when the polymer element is switched between a hydrophilic state and a hydrophobic state.

All the embodiments of this invention, which will be described below, are used to move a hydrophilic fluid. However, when the fluid to be ejected is hydrophobic, the embodiments described below are applied using appropriate polymers. For example, polymers can be chosen which are in their hydrophobic state when they are not subject to an external stress and in their hydrophilic state when they are subject to an external stress.

BRIEF DESCRIPTION OF THE DRAWINGS

Other characteristics will appear on reading the description below, with reference to the drawings wherein.

DETAILED DESCRIPTION OF THE INVENTION

Figure 1A:
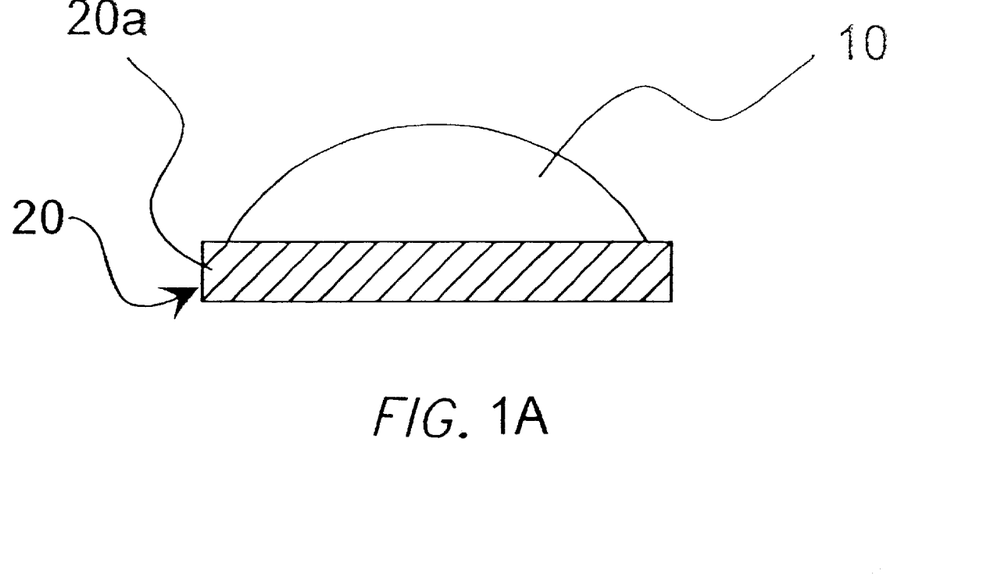
FIG. 1A represents a polymer element in a hydrophilic state on which there is a drop of hydrophilic fluid.
Figure 1B:
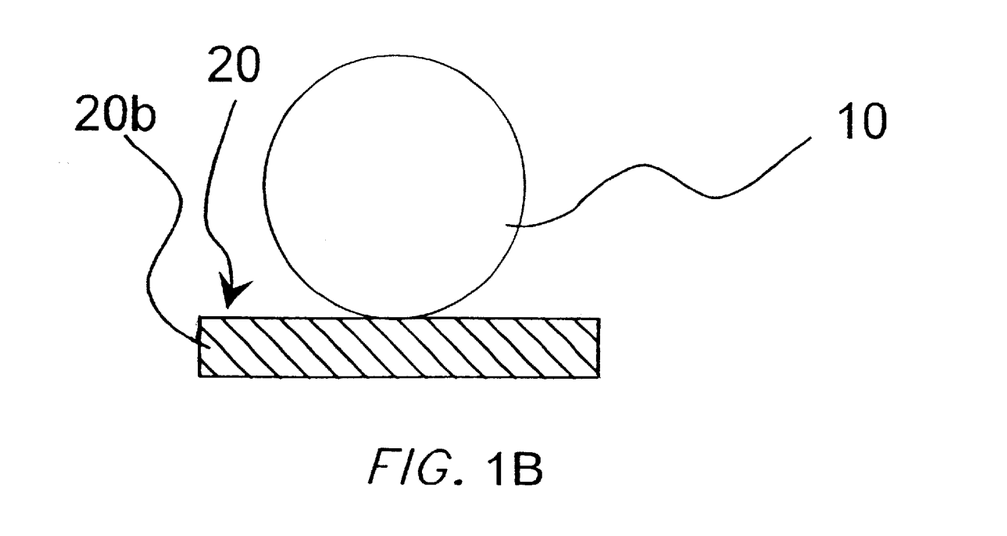
FIG. 1B represents a polymer element in a hydrophobic state on which there is a drop of hydrophilic fluid.

In general, the technique used to move a fluid 10 according to the present invention includes using a polymer element 20 whose hydrophilic or hydrophobic properties can be selected under the action of an external stress. Thermo-reversible polymers comprise surfaces which are sensitive to the temperature and the polymers are prepared by grafting layers of PNIPAAm poly (N-isopropylacrylamide) hydrogel on the surface of silicone wafers. Several known techniques by those skilled in the art are developed to graft PNIPAAm on the surfaces. For example, the PNIPAAm layer can be immobilized on the surfaces of substrates by chemical (described in the publication Macromolecules 1994, Takei Y. G.) and physical grafting. By introducing for example PNIPAAm claims with freely mobiles ends, the surface properties are altered within a narrow temperature range, and the surface responds to the temperature changes rapidly. These polymers change their properties when a change occurs in environmental stimuli, for example temperature. Thus, under the action of a stimulus element the state of aqueous solutions of PNIPAAm changes from hydrophobic to hydrophilic, and inversely, in a fast and reversible manner around the lower critical solution temperature (LCST) of about 32° C. LCST is also called the phase transition temperature Tg of the polymer. PNIPAAm chains have an expanded conformation in water below the LCST due to the strong hydration and change to compact forms above the LCST by sudden dehydration. Practically the reversible hydrophilic or hydrophobic properties of the surface of polymers are determined by the dynamic contact angle. The grafting operation is arranged to create a cross-linked PNIPAAm layer on the surface of the silicone wafer. The effect of the temperature on the surface properties modified by a cross-linked PNIPAAm layer is evaluated by aqueous dynamic contact angle measurements. The cross-linked PNIPAAm layer swells by imbibing water, below the LCST, and water spreads on the surface of the substrate; subsequently, the contact angle of the surface is lower (FIG. 1A). The cross-linked PNIPAAm layer shrinks and becomes more hydrophobic, above the LCST ; the water cannot spread on the surface and the surface exhibits a higher contact angle (FIG. 1B). Thus, the morphology of the surface modified by a cross-linked PNIPAAm layer leads to a completely hydrophilic surface with a contact angle equal to zero degree below 25° C. (FIG. 1A) and a contact angle of more than 90 degrees above 40° C. when the surface becomes extremely hydrophobic (FIG. 1B). The polymer element 20 can be in a hydrophilic state 20*a* or in a hydrophobic state 20*b*. The principle is to have an element 20 composed of such polymers in contact with the fluid 10 that is to be moved. When the polymer element 20 is in its hydrophilic state 20*a*, as represented in FIG. 1A, the fluid 10 tends to stay in contact with the polymer element 20. However, when the polymer element 20 is switched to its hydrophobic state 20*b*, as represented in FIG. 1B, the fluid 10 tends to be repelled and therefore to form a drop on the surface of the polymer element 20. Thus, the switching of the polymer element 20 from one state to the other causes movement of the fluid 10.

Depending on the polymer selected, the external stress necessary to switch it from one state to the other can be determined, and therefore the stimulus element to generate the external stress.

When thermo-reversible polymers are selected, the polymers which, when their temperature exceeds a threshold temperature called the phase transition temperature, switches from a hydrophilic state to a hydrophobic state or vice-versa, the external stress will be the application of thermal energy. Preferably thermo-reversible polymers should be chosen that have a phase transition temperature between 20 and 100° C., and preferably between 30 and 70° C.

Figure 2:
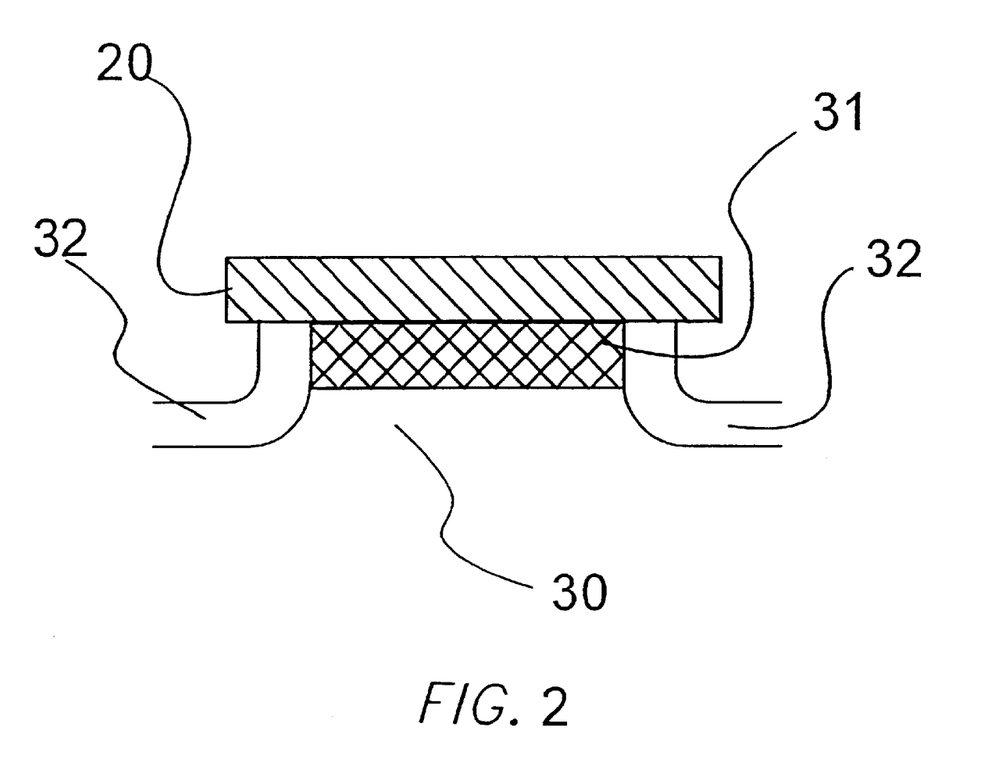
FIG. 2 represents a polymer element provided with a means to generate an external stress.

FIG. 2 represents a polymer element 20 provided with the stimulus element 30 to generate the external stress, that is in this case, thermal energy. The element 30 is made up of a temperature control element, for example a heating element 31 placed below the polymer element. The heating element 31 is made up for example with a thin layer of polycrystal silicon (resistor), wherein a current is made to flow that is adapted to the generation of a quantity of thermal energy that allows the polymer to exceed its phase transition temperature to switch from one state to the other. The polymer element 20 can then return to its initial state, its temperature having decreased by the simple diffusion of the heat. Also an additional cooling system can be provided such as for example a radiator or a Pelletier effect device.

The thermo-reversible polymers which are used in the present device are organic polymers such as those described in Pat. Application WO 91/15526. These are polymers that have a hydrophilic group and a hydrophobic group, the hydrophilic group being a water-soluble ionic polymerizable vinyl monomer, and the hydrophobic group comprising an acrylamide or methacrylamide monomer. For example a poly(N-alkylacrylamide), a modified glycol polyethylene or a polysilylamine will be chosen. Preferably a polymer will be used that switches from one state to the other very fast, for example poly(N-isopropylacrylamide).

To make the polymer element 20 switch from its hydrophilic state to its hydrophobic state, it has to exceed a hydrophilic/hydrophobic phase transition temperature Tg proper to the polymer. Poly(N-isopropylacrylamide) has a temperature Tg of about 32° C. When the polymer is at a temperature less than 32° C., it is hydrophilic. When it is higher than 32° C., it becomes hydrophobic. In addition, the hydrophilic/hydrophobic phase transition temperature of a polymer can be modified by different means. For example adding a surfactant to the fluid to be carried can increase the phase transition temperature. This technique is described in the publication, Langmuir, 1995, volume 11, No. 7, pages 2493–2495. For example the phase transition temperature Tg of poly(N-isopropylacrylamide) can be modified from 32° C. to 90° C.

Electrically conductive organic polymers can be chosen, for example polymethylethiophene, which under the action of an electric current as an external stress switches from the hydrophilic state to the hydrophobic state or vice-versa. The stimulus element to generate the external stress in this case are means to apply an electric current to the polymer element.

Depending on the polymer selected, other external stresses can be used such as for example, a pH change, an ionic strength change or a pressure. For each polymer, the means suitable to generate the stress will be determined by those skilled in the art who know the stress necessary to switch the polymer from the hydrophilic state to the hydrophobic state.

Surfaces of the polymer have an improved sensitivity to temperature changes in increasing the cross-linking density of the polymer layer and varying the polymerization time. Subsequently, in a capillary tube or channel whose internal wall is coated by a cross-linked PNIPAAm layer, an aqueous solution is expelled from said channel if the polymer is in hydrophobic state. For example, the difference in the water heights reaches 10 mm in a channel with a diameter of 2 mm with a change in temperature from 25 to 50° C.

For the relevant polymers, it is known that the hydrophilic/hydrophobic state change causes the polymer's volume to vary. However, it is preferable to cope with these volume variations. Also, how to control the volume variations of polymers that can switch from a hydrophilic to a hydrophobic state is known. Therefore, known techniques such as those described in Polymer Communications, 1991, volume 32, pages 322–323, "Synthesis of fast response, temperature-sensitive poly(N-isopropylacrylamide) gel", can be used.

In the embodiments, which will be described, the polymers used are thermo-reversible polymers.

Figure 3:
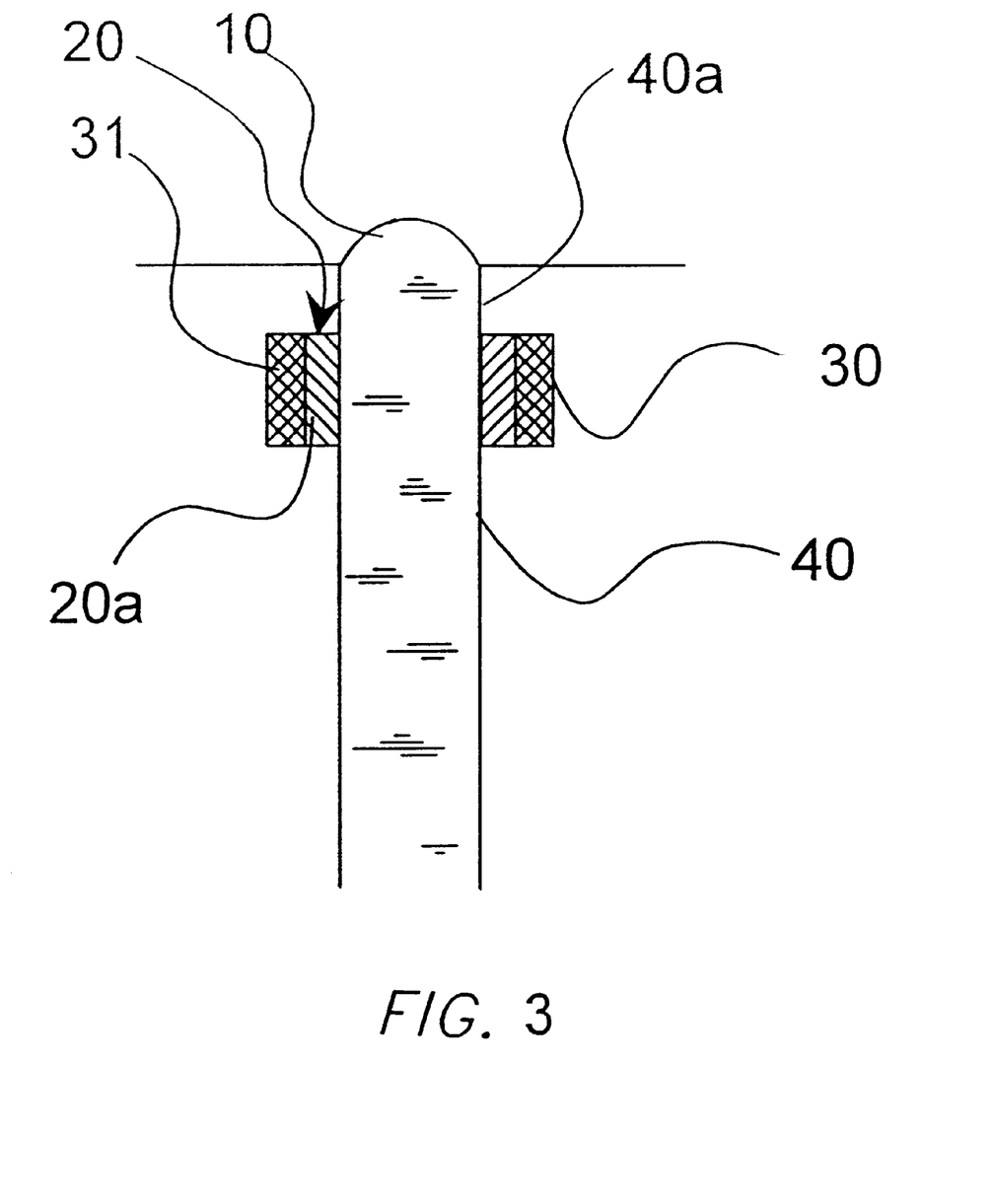
FIG. 3 represents a channel for ejecting a fluid provided with the means to move the fluid according to the invention, the polymer element being in a hydrophilic state.
Figure 4:
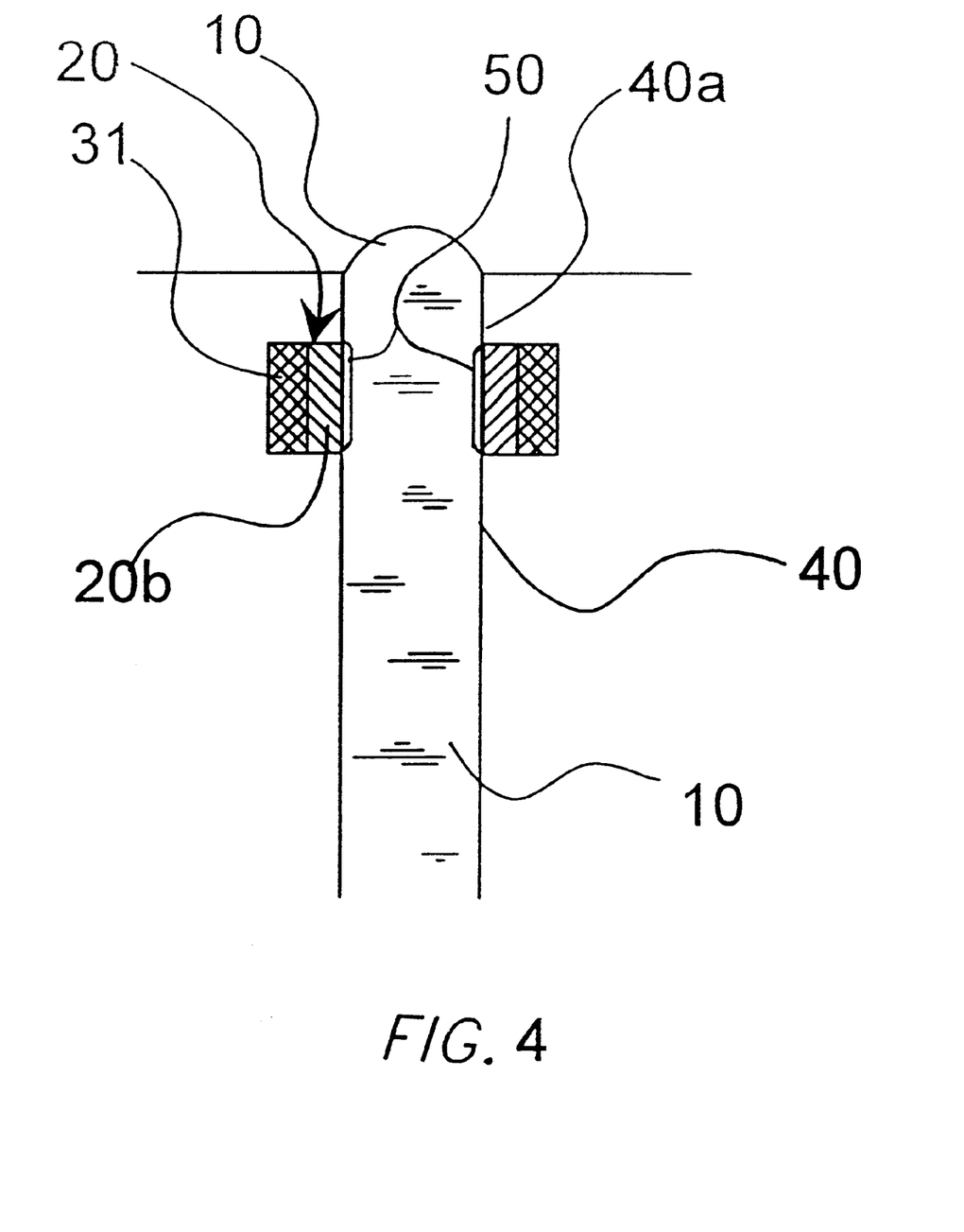
FIG. 4 represents a channel for ejecting a fluid provided with the means to move the fluid according to the invention, the polymer element being in a hydrophobic state.

FIGS. 3 and 4 illustrate a channel 40 filled with a fluid 10. In order to move the fluid 10 out of the channel 40, elements 20, 30 are provided for moving the fluid 10 along the internal wall of the channel 40, close to the end 40a of the channel. The moving elements include a polymer element 20 whose hydrophilic or hydrophobic properties can be selected under the action of thermal energy. The polymer element 20 can be in a hydrophilic state 20a or hydrophobic state 20b. The moving element also include element to control the temperature, which is the heating element 31 for the polymer element 20. The heating element 31 is the same as described for FIG. 2. The polymer element 20 is covered by the heating element 3 1. The polymer element 20 can then be heated to exceed a threshold temperature, which is the polymer's phase transition temperature. In the device represented in FIG. 3, the polymer element 20 is represented in its hydrophilic state 20a. The fluid 10 is uniformly distributed throughout the channel 40. FIG. 4 represents the polymer element 20 in its hydrophobic state 20b. In this case, the fluid 10 found at the hydrophobic polymer element 20b tends to be repelled by this element, with an empty volume 50 thus being created inside the channel 40 near the channel. The volume of fluid that was found between the polymer element 20 and the end 40a of the channel is an independent volume of fluid that is moved out of the channel. In order to prevent the return of the fluid into the device of feeding the fluid, the feeding device can be maintained under pressure by any means known to those skilled in the art.

In a preferred embodiment of the invention, the fluid to be moved by the device according to the invention is a printing fluid, for example printing ink, or a thermopolymer which allows three-dimensional printing in stereolithographic processes.

Figure 5A:
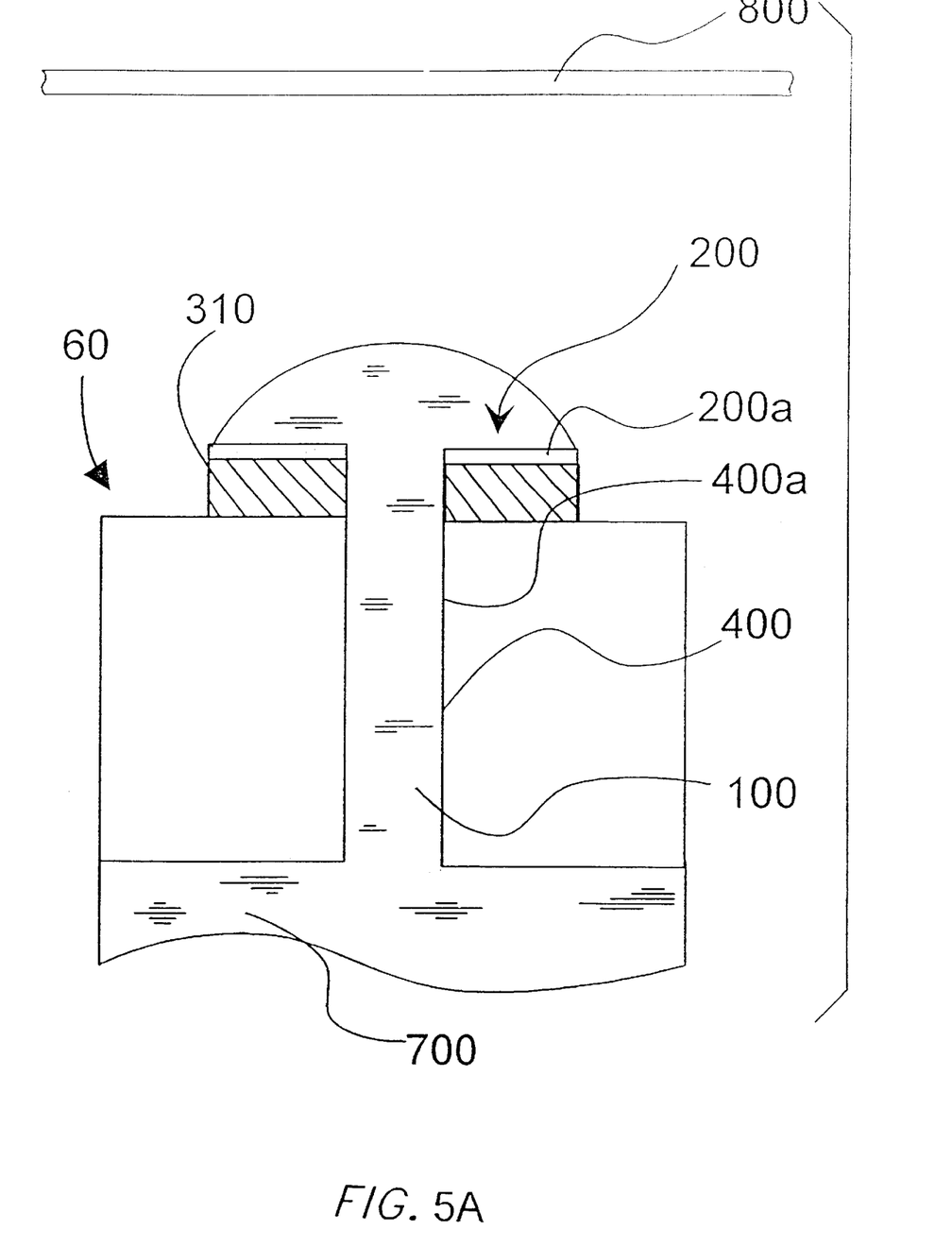
FIG. 5A represents a portion of a print fluid jet head provided with the means to move the fluid according to the invention, the polymer element being in a hydrophilic state.
Figure 5B:
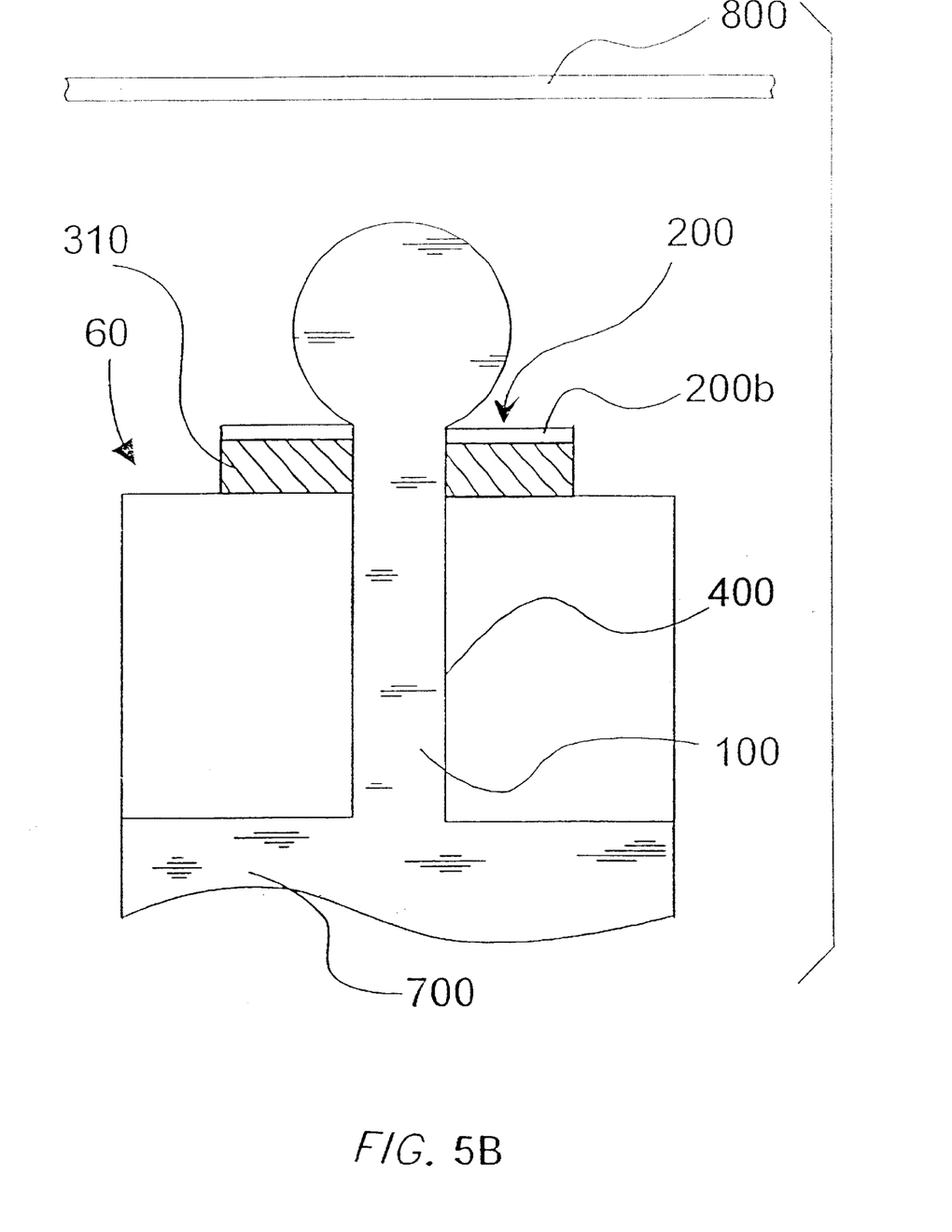
FIG. 5B represents a portion of a print fluid jet head provided with the means to move the fluid according to the invention, the polymer element being in a hydrophobic state.

FIGS. 5A and 5B illustrate a portion of a fluid jet head 60 for printing on a support 800 which comprises a device for feeding 700 the printing fluid, and a channel 400 for moving the fluid 100 outwards. In particular, when the fluid is ink 100, the device for moving the fluid according to the invention is an ink jet head. The channel 400 ends in a nozzle 400a open to the outside. The periphery of the nozzle 400a is provided with a polymer element 200. The polymer element 200 can be in a hydrophilic state 200a or in a hydrophobic state 200b. Such an element is provided to create an ink drop 100, thus allowing the ink 100 to be ejected. The polymer element 200 is preferably a very thin layer. The element for controlling the temperature is a beating element 310 such as described above. The heating element 310 is provided below the polymer element 200.

FIG. 5A represents the portion of the ink jet head when the polymer element 200 is in its hydrophilic state 200a. As the device for feeding 700 the ink always is maintained under pressure to prevent the ink from returning into the device for feeding 700, the inks tends to come and stay in contact with the polymer element 200a. When the polymer element switches to its hydrophobic state 200b as is shown in FIG. 5B, the ink tends to go away from the polymer element 200. Since the device for feeding the ink is maintained under pressure, the ink cannot return to the device for feeding 700 and an ink drop forms. The ink drop 100 can then be ejected by any means known to those skilled in the art. For example an electrostatic field can be applied as described in Pat. Application WO 96/322284.

In a variant of this embodiment, the polymer element is provided not at the periphery of the nozzle but along the internal wall of the channel 400, close to the nozzle 400a. The polymer element is preferably ring-shaped. In this embodiment, an element at the periphery can also be used to allow the ink to be ejected. For example, if the fluid is hydrophilic, the element will be a hydrophobic polymer element.

Figure 6:
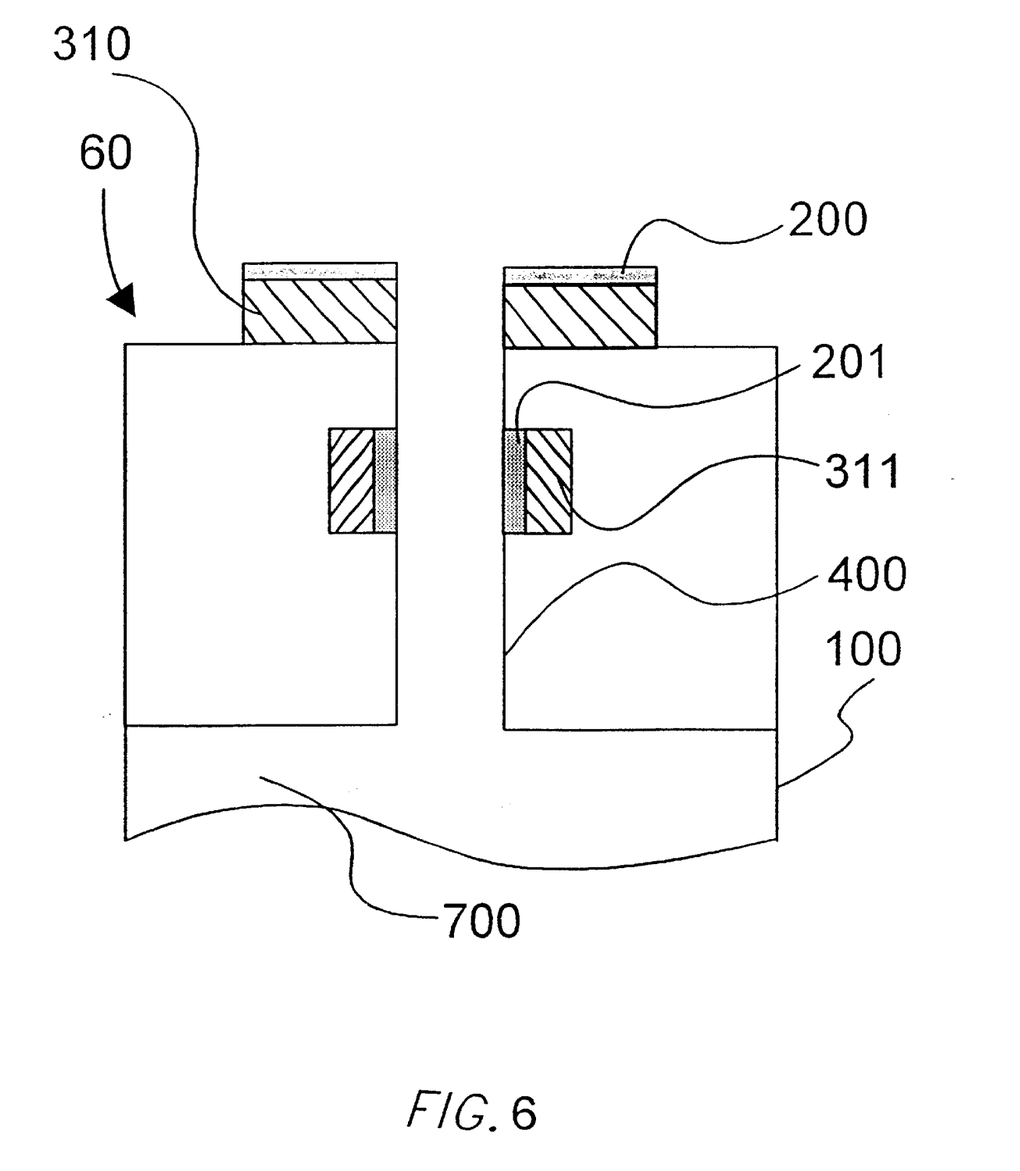
FIG. 6 represents a second embodiment of a print fluid jet head provided with the means to move the fluid according to the invention.

FIG. 6 represents another embodiment of the ink jet head 60 according to the invention. A first polymer element 200 is provided at the periphery of the nozzle 400a and a second polymer element 201 is provided along the internal wall of the channel 400. The polymer element 201 is preferably ring-shaped. Heating elements 310 and 311 are provided to heat the polymer elements 200 and 201 respectively. In this embodiment, the volume of the drop to be ejected can be determined. The polymer elements 200 and 201 are initially in a hydrophilic state. When a volume of ink required to form a drop is obtained, the polymer element 201 is heated and switches to its hydrophobic state. The volume of ink is moved out of the channel 400. Then the polymer element 200 is switched to its hydrophobic state in order to allow the ink drop to be ejected. Since the polymer element 201 is maintained in its hydrophobic state, the ink drop cannot return to the channel 400.

Figure 7:
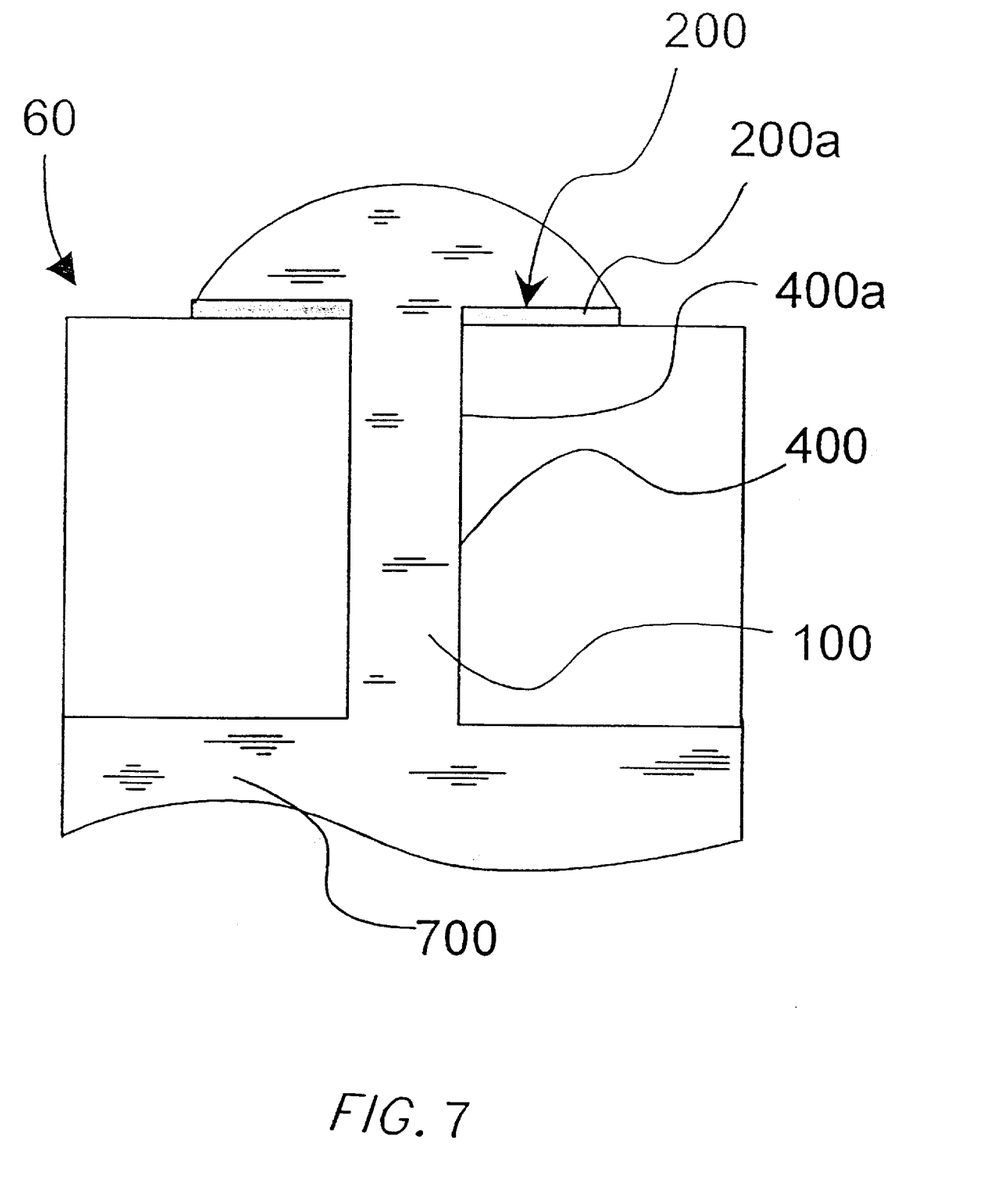
FIG. 7 represents a third embodiment of a print fluid jet head provided with the means to move the fluid according to the invention.

According to another embodiment represented in FIG. 7, heating means, not illustrated, are provided to heat, not the polymer element directly, but the ink 100 in the device of feeding the ink 700. A polymer element 200 is provided at the periphery of the nozzle 400a. To prevent the ink drop that forms at the periphery of the nozzle 400a from spreading over the whole external surface of the ink jet head 60, the materials of the external surface of the ink jet head are planned to be hydrophobic. The ink will therefore not tend to spread beyond the polymer element 200.

The ink 100 is heated to a temperature T higher than the phase transition temperature Tg of the polymer element 200. When the ink 100 leaves the nozzle 400a at the temperature T, it is in contact with the polymer element 200. The heat of the ink is transferred to the polymer element 200, which exceeds its phase transition temperature Tg. Then the polymer element 200 switches to its hydrophobic state 200b. The wetting angle of the ink 100 increases, therefore creating an ink drop 100. The ink drop 100 can then be ejected in the same way as described in the embodiment represented in FIG. 5B. When the heating means is not activated, the ink 100 has a temperature less than the phase transition temperature of the polymer element 200, which is therefore in its hydrophilic state 200a. In this case, the ink cannot form a drop at the surface of the ink jet head, and therefore there is no ejection. In addition, in order to prevent the ink jet head from blocking because of ink drying at the channel opening, the pressure maintained in the device of feeding can be decreased or canceled in order to return the ink into the feeding means.

Figure 8:
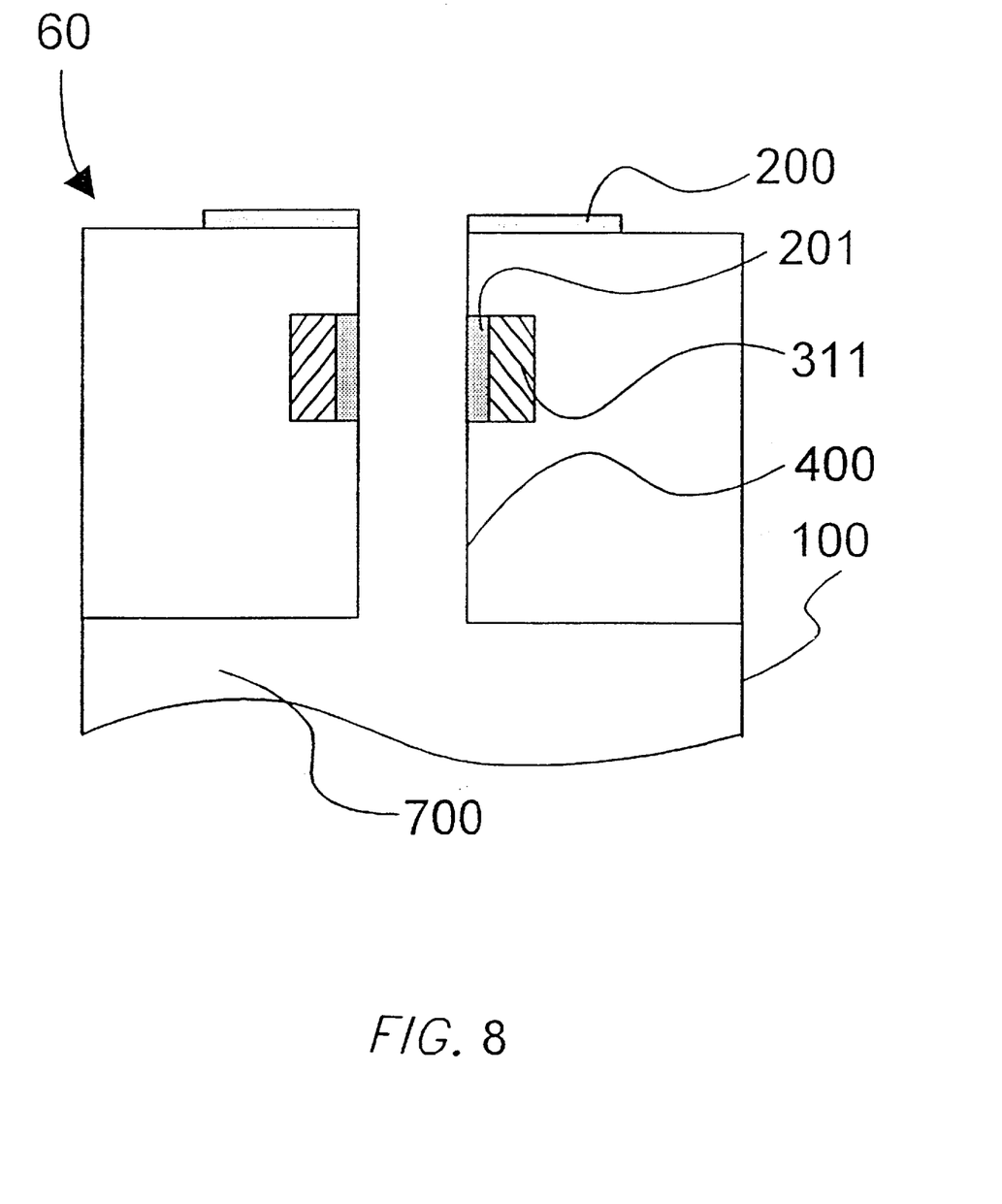
FIG. 8 represents a fourth embodiment of a print fluid jet head provided with the means to move the fluid according to the invention.

In a further embodiment, a ring-shaped polymer element 201 can be advantageously provided inside the channel 400 so as to control the ejection of the ink 100. FIG. 8 represents this embodiment. Heating element 311 such as described in FIG. 2 is provided to heat the polymer element 201. The polymer element 201 covers the whole surface area of the heating element 311, so that the whole surface of the polymer element 201 changes state. The phase transition temperature Tg' of the polymers used in the polymer element 201 must be higher than the phase transition temperature Tg of the polymers used in the polymer element 200 and higher than the temperature T of the ink. When ink 100 is not to be ejected, the polymer element 201 is maintained in its hydrophobic state by raising it to a temperature higher than Tg' using the heating element 311. The heating element 311 works for example in generating a heating or a rise of the temperature, from the base of said heating element 311 located on the side of the device of feeding the ink 700 towards the other side of said heating element 311 located on the side of the opening of the channel 400. In another embodiment, the heating element 311 is working according a on-off mode, i.e. the temperature is raised in the whole heating element 311 in an homogeneous way; The ink 100 present in the channel 400 is no longer able to run out to the surface of the ink jet head, making all ejection impossible. When the ink 100 is to be ejected, first the polymer element 201 is maintained in its hydrophilic state by not activating the heating element 311. Therefore the ink 100 can run freely out to the surface of the ink jet head. As the ink temperature T is higher than the phase transition temperature Tg of the polymer element 200, it follows that on contact with the ink, this polymer element 200 will switch from the hydrophilic state to the hydrophobic state and therefore allow an ink drop to form on the surface of the head. The polymer element 201 can then be raised to its hydrophobic state by activating the heating element 311 which stops the flow of ink in the channel 400 and therefore allows the volume of ink to be ejected to be accurately selected. When the drop thus formed has been ejected, the polymer element 200, which is no longer in contact with the heated ink, returns to its hydrophilic state. In order to be able to restart the ejection cycle of an ink drop, the heating element 311 is deactivated, which allows the polymer element 201 to return to its hydrophilic state and therefore allows the ink 100 to run freely in the channel 400 out to the surface of the ink jet head.

The invention has been described in detail with particular reference to certain preferred embodiments thereof, but it will be understood that variations and modifications can be effected within the spirit and scope of the invention.

What is claimed is:

1. A device for moving a fluid comprising:
    a) at least one polymer element having hydrophilic or hydrophobic properties, said polymer element being in contact with said fluid; and
    b) at least one stimulus element for generating an external stress on said at least one polymer element to select hydrophilic or hydrophobic properties corresponding to two different hydrophilic or hydrophobic states of said at least one polymer element, and thus allowing a switching of said polymer element from one state to the other.

2. A device as claimed in claim 1, wherein the fluid is moved in at least one channel located in said device.

3. A device as claimed in claim 2, wherein said at least one polymer element is provided along an internal wall of said channel.

4. A device as claimed in claim 3, wherein said at least one polymer element, whose hydrophilic or hydrophobic properties are selected under the action of an external stress, is a thermo-reversible polymer.

5. A device as claimed in claim 3, wherein said at least one polymer element whose hydrophilic or hydrophobic properties are selected under the action of an external stress is an electrically conductive organic polymer.

6. A device as claimed in claim 5 wherein the stimulus element for generating said external stress is a device to apply an electric current.

7. A device as claimed in claim 1, wherein said stimulus element for generating said external stress are temperature control devices.

8. A device as claimed in claim 7, wherein said temperature control devices include a resistor in contact with the polymer element, said resistor being fed by an electrical circuit.

9. A printing fluid jet head comprising:
    a) at least one internal channel ended by a nozzle, an outflow of a printing fluid in said nozzle being directed to an outside of said fluid jet head;

b) at least one device for feeding a printing fluid through an end of the internal channel opposite to said nozzle;

c) a device for moving the printing fluid, said device for moving the printing fluid comprising at least one polymer element having hydrophilic or hydrophobic properties, said polymer element being in contact with said printing fluid, the hydrophilic or hydrophobic states being selected under an action of an external stress provided by at least one stimulus element.

10. A printing fluid jet head as claimed in claim 9, wherein the stimulus element for generating the stress on the polymer element is included in said fluid jet head.

11. A printing fluid jet head as claimed in claim 10, wherein said at least one polymer element is provided either at a periphery of an opening of the nozzle or along an internal wall of the channel, or at a periphery of the opening of the nozzle and along the internal wall of the channel.

12. A printing fluid jet head as claimed in claim 11, wherein the polymer element provided along the internal wall of the channel is located close to the opening of the nozzle.

13. A printing fluid jet head as claimed in claim 10, wherein the polymer element whose hydrophilic or hydrophobic properties are selected under the action of an external stress is a thermo-reversible polymer.

14. A printing fluid jet head as claimed in claim 13, wherein the stimulus elements for generating the external stress are temperature control elements.

15. A printing fluid jet head as claimed in claim 14, wherein the temperature control elements include resistors fed by an electrical circuit, each polymer element being in contact with one resistor.

16. A printing fluid jet head as claimed in claim 15, wherein the temperature control elements are provided to control the temperature of the printing fluid in the device of feeding the printing fluid.

17. A printing fluid jet head as claimed in claim 16, wherein said at least one polymer element is provided at a periphery of an opening of the nozzle and along an internal wall of the channel, and said temperature control elements includes a resistor in contact with the polymer element provided along the internal wall of the channel.

18. A printing fluid jet head as claimed in claim 10, wherein the polymer element is an electrically conductive organic polymer.

19. A printing fluid jet head as claimed in claim 18, wherein the stimulus element for generating the external stress on the polymer is an element to apply an electric current.

20. A printing fluid jet head as claimed in claim 9, wherein the printing fluid is ink.

21. A printing method comprising the steps of:

a) contacting a fluid with a polymer element, said polymer element comprising polymers whose hydrophilic or hydrophobic properties are selected under an action of an external stress; and b) moving said fluid by switching said polymer element between a hydrophilic state and a hydrophobic state.

22. A printing fluid jet head comprising:

a polymer element having hydrophilic or hydrophobic properties which are selected under an action of an external stress, said polymer element being adapted to contact a fluid and to move said fluid when the polymer element is switched between a hydrophilic state and a hydrophobic state.

* * * * *